(12) United States Patent
Baldwin et al.

(10) Patent No.: US 6,310,952 B1
(45) Date of Patent: Oct. 30, 2001

(54) TELEPHONE ACCESS TO OVERLY POPULAR SERVICES

(75) Inventors: Michael Scott Baldwin, Plainfield; Sungho Jin, Millington; Gregory Peter Kochanski, Dunellen, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/108,480

(22) Filed: Jul. 1, 1998

(51) Int. Cl.[7] .................................................... H04M 3/00
(52) U.S. Cl. .............................. 379/266.01; 379/265.02; 379/209.01
(58) Field of Search ........................ 379/266.01, 265.02, 379/209.01, 309, 201.01, 265.01, 265.14, 219, 220.01; 370/259, 270; 348/14, 15, 16

(56) References Cited

U.S. PATENT DOCUMENTS

| | | | | |
|---|---|---|---|---|
| 5,937,057 | * | 8/1999 | Bell et al. .............................. | 379/265 |
| 5,946,388 | * | 8/1999 | Walker et al. ........................ | 379/266 |
| 5,982,873 | * | 11/1999 | Flockhart et al. .................... | 379/266 |
| 6,002,760 | * | 12/1999 | Gisby .................................... | 379/666 |
| 6,088,444 | * | 7/2000 | Walker et al. ........................ | 379/266 |

* cited by examiner

Primary Examiner—Ahmad Matar
Assistant Examiner—Benny Q. Tieu

(57) ABSTRACT

A method and apparatus for providing easy access to a service provider that provides service over a communications system. In accordance with the present invention, a caller that wishes to gains access to the service provider simply needs to make a single call to a so-called queuing system, and hang up. The queuing system obtains information regarding the caller such as the caller's name, address and phone number, makes a connection with the service provider, calls-back the caller when the connection is made, and connects the caller to the service provider through the connection. The caller is thereby connected to the service provider without having to spend a substantial amount of his/her free time making calls. This is particularly advantageous when the service provider is popular or oversubscribed (e.g. a service that provides Super Bowl tickets).

35 Claims, 1 Drawing Sheet

TELEPHONE ACCESS TO OVERLY POPULAR SERVICES

FIELD OF THE INVENTION

The present invention relates to the field of telecommunications, and more particularly to a method and apparatus for providing automated access to services provided over a telecommunications system.

BACKGROUND OF THE INVENTION

Telecommunication systems are used to provide many different types of services. Such services include ticket sales for entertainment events, airline reservations, stockbrokerage services, and reservation services for things like golf tee times and hotel rooms. To access these services on a conventional telecommunications system, a caller simply needs to dial the phone number of the service provider and make a service request when the service provider answers the call.

The service provider is not always able to answer the call, however. Sometimes, the service that the service provider provides can become extremely popular and oversubscribed. That is, the number of callers trying to call the service providers can become greater than that which the service provider can physically handle at a given time. A prime example of this occurs when a golf course opens up its golf-tee-time reservation service for Saturday tee-times during the peak of the golf season. Other examples of services that become popular and oversubscribed are services that provide access to World Series tickets and/or Super Bowl tickets. At certain times, such services typically receive many more calls than it has phone lines, and thus become oversubscribed.

When a given service becomes extremely popular and oversubscribed, a party calling the given service, or caller, may receive a busy signal or a voice message stating, for example, that all representatives are busy and that he/she should call again later. The term "caller" as used herein includes general purpose computers operating by stored program control as well as telecommunications equipment operated by humans. Thus, the term "call" as used herein includes voice telephone calls as well as calls or communications over a data network (e.g. TCP/IP, ATM and virtual circuits). When a caller is refused a connection to the service provider due to oversubscription, the caller may be placed in the position of having to repeatedly call the service provider until a connection is finally obtained. Since, in some instances, the caller may not make a connection with the service provider for several hours, such repeat calling can substantially interrupt the daily activities of the caller.

One solution to the just-described oversubscription problem has been to supply the caller with an automatic re-dial feature. Automatic re-dial enables the caller to re-dial a phone number by pressing or activating a single button or function of the terminal equipment or general purpose computer. Although automatic re-dial can reduce the time it takes for a caller to repeatedly call the same service provider (e.g. the same phone number or data network address), it still requires the caller to take the time to physically activate the re-dial feature each time a call to the service provider is made, and it requires the caller to continuously monitor each call to determine whether the service provider has answered the call. As a result, even when provided with automatic re-dial, the caller may still be required to spend a substantial amount of time monitoring each call.

SUMMARY OF THE INVENTION

The present invention solves the oversubscription problem without requiring a caller to spend a substantial amount of time monitoring a plurality of calls, and without substantially interrupting the daily activities of the caller. Instead, the caller is only required to make a single call to a so-called queuing system, and hang-up. The queuing system, in accordance with the principles of the present invention, is operable to obtain a set of information regarding the caller, place the caller in a queue that may include other callers trying to reach a given service provider, make a service connection with the service provider, and connect the caller to the service connection when the caller reaches a priority position in the queue. The term "service connection" as used herein refers to a connection between the queuing system and the service provider over a communications system (e.g. a telecommunications system, or a data network such as an ATM network). Advantageously, the queuing system enables the caller to reach the service provider over a communications system without having to repeatedly call the service provider and without having to spend a substantial amount of time waiting for a connection.

In particular embodiments, the set of information provided to the queuing system includes the caller's name, the address at which the caller can be reached (e.g. the caller's phone number or the caller's data network address), the amount of money the caller is willing to bid to move up in the queue, and the time at which the caller wants to be removed from the queue. In such embodiments, the queuing system is composed of several subsystems, that operate asynchronously, and a queue that maintains an ordered rank of callers. The subsystems include a user telephony subsystem, a user interface subsystem, a user agent subsystem, an output subsystem and a billing subsystem.

In such embodiments, the output subsystem is operable to repeatedly call the service provider to make a service connection between the service provider and the queuing system, and to connect a caller having a priority position in the queue to the service connection. The user interface subsystem is operable to enable the caller to interact with the queuing system via a computer screen and keyboard, via speech recognition and speech synthesis for voice control, and/or via touch tones and synthesized speech for control from a standard telephone terminal. The user interface subsystem is also operable to maintain the queue of callers. The user agent subsystem is operable to keep track of each caller's position in the queue, and to initiate a call-back to the caller when the caller reaches a position near a priority position in the queue, and/or when the caller's position in the queue changes dramatically (e.g. due to other callers withdrawing from the queue, or due to other callers making higher bids than the caller). The user telephony subsystem is operable to accept an incoming call from a caller, connect the accepted call to the user interface subsystem, and process requests from the other subsystems. Such requests include requests from the user agent subsystem to call-back a caller when the caller's position in the queue dramatically changes, and requests from the output subsystem to connect a caller having a given priority in the queue to the service provider over the service connection established by the output subsystem.

These and other features of the invention will become more apparent from the detailed description when taken with the drawings. The scope of the invention, however, is limited only by the claims.

DETAILED DESCRIPTION OF ILLUSTRATIVE EMBODIMENTS OF THE INVENTION

Figure 1:
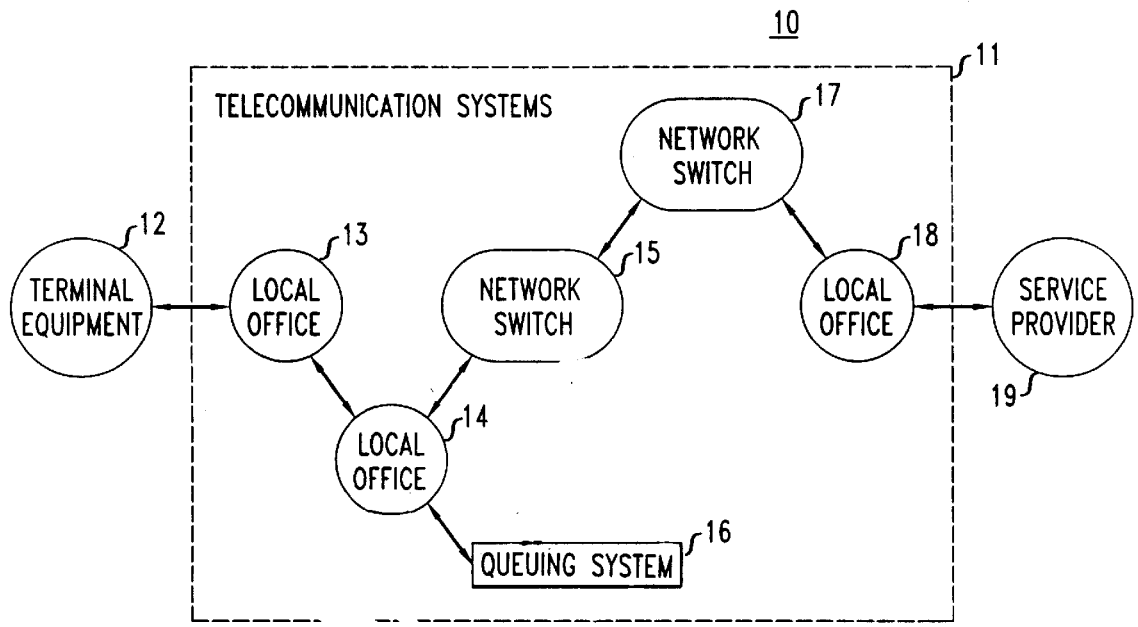
FIG. 1 is a block diagram of an illustrative embodiment of a telecommunications system having a queuing system for providing access to service providers in accordance with the principles of the present invention.

Referring now to FIG. 1, there is shown an illustrative embodiment of a telecommunications system 10 having a queuing system 16 for providing access to service providers in accordance with the principles of the present invention. As shown, telecommunications system 10 is connected between terminal equipment 12 and service provider 19. Telecommunications system 10 has a local office 13 connected to a local office 14 and terminal equipment 12. Local office 14 is connected to queuing system 16 and network switch 15. Network switch 15 is connected to network switch 17 which, in turn, is connected to local office 18. Local office 18 is connected to service provider 19.

In operation, a caller at terminal equipment 12, having the intention to gain access to service provider 19, dials the number of, or calls, queuing system 16 which is operable to provide access to service provider 19 in accordance with the principles of the present invention. The call travels from terminal equipment 12 through local offices 13 and 14 to queuing system 16. When the call reaches queuing system 16, queuing system 16 checks it's queue to determine whether there are other callers waiting to be connected to service provider 19. If the queue is empty, queuing system 16 informs the caller to wait on the line, and connects the caller to service provider 19 when queuing system 16 establishes a service connection with service provider 19. If the queue is not empty, then queuing system 16 obtains a set of information regarding the caller, and informs the caller to hang-up and that he/she will be contacted when it is that caller's turn in the queue (i.e. when the caller reaches a priority position in the queue). The information regarding the caller includes the caller's name, the address at which the caller can be reached (e.g. the caller's phone number, or the caller's data network address), the amount of money the caller is willing to bid to move up in the queue, and the time at which the caller wants to be removed from the queue. Once the caller information is received, the caller is placed in a queue at a position that depends on the amount bid for a higher location in the queue and the number of callers already waiting in the queue. For example, if the caller bids an amount that is greater than the amount bid by every other caller in the queue, then the caller may be placed at the top of the queue, and thus would be the next caller to be connected by queuing system 16 to the service provider.

While accepting incoming calls from callers that wish to reach the service provider and while placing the callers in the queue, queuing system 16 continuously sends outgoing calls to service provider 19 to establish a service connection for each caller in the queue. The outgoing calls travel from queuing system 16 through network switches 17 and 18, through local office 18, to service provider 19. While making a service connection, queuing system 16 activates a call-back to a caller having a near-priority position in the queue. When the caller answers the call-back, queuing system 16 determines whether the caller is ready to and/or still intends to access service provider 19. If the caller indicates that he/she no longer intends to access service provider 19 and/or does not answer the call-back, then queuing system 16 will offer the service connection to the caller having the next highest priority in the queue. If the next caller indicates that he/she still desires to gain access to service provider 19, then queuing system 16 connects that available caller to service provider 19 through the service connection. If the next caller is not available (i.e. does not answer the call-back) or no longer desires to gain access to service provider 19, then queuing system 16 continues to initiate call-backs to the callers having the next highest priority in the queue until an available caller having still having a desire to access service provider 19 is identified. Once such an available caller is identified, queuing system 16 then connects that caller to the service connection. Once a given caller is connected to service provider 19 in such a manner, queuing system 16 automatically bills the caller for any bids that he/she made to move-up in the queue, and/or for the service provided by queuing system 16.

Figure 2:
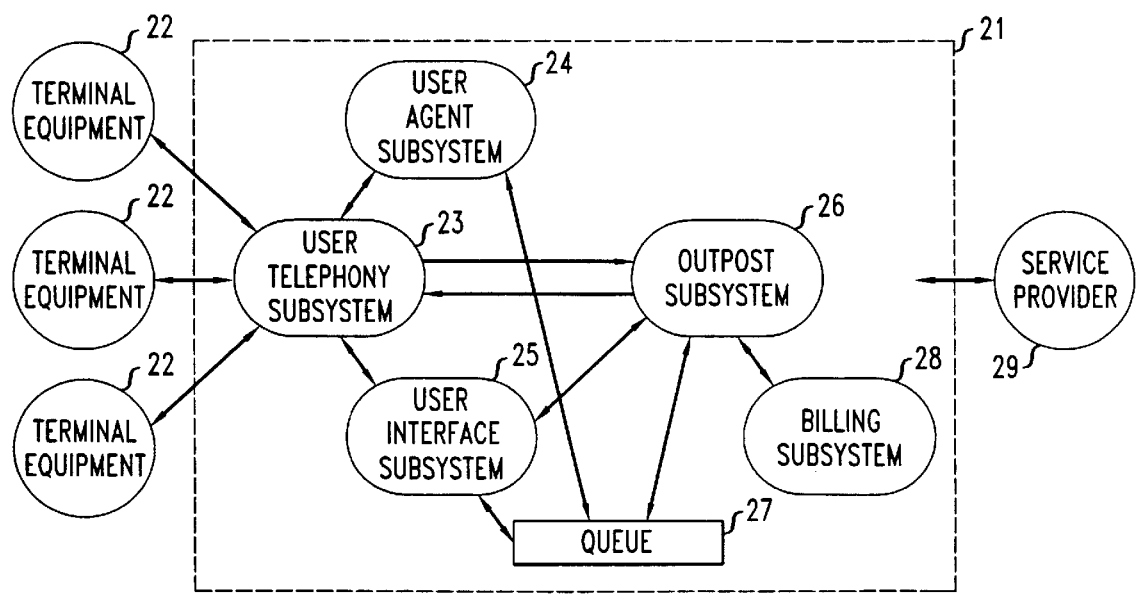
FIG. 2 is a block diagram of an illustrative embodiment of the queuing system shown in FIG. 1.

The manner by which queuing system 16 performs the just-described functions or operability in accordance with the principles of the present invention can be explained by describing the operation of a more detailed embodiment of queuing system 16. Referring now to FIG. 2 there is shown an illustrative embodiment of a more detailed version of queuing system 16, hereinafter referred to as queuing system 21. As shown, queuing system 21 is connected between terminal equipment 22 and service provider 29. Queuing system 21 has a user telephony subsystem 23 connected to a user interface subsystem 25, a user agent subsystem 24, and an output subsystem 26. User agent subsystem 24 is connected to queue 27. User interface subsystem 25 is connected to output subsystem 26 and queue 27. Output subsystem 26 is connected to queue 27, billing system 28 and service provider 29.

In operation, calls from terminal equipment 22 are accepted by user telephony subsystem 23. Once a call is accepted, user telephony subsystem 23 connects the call to user interface subsystem 25. User interface subsystem 25 then checks whether there are any other callers in queue 27 intending to gain access to service provider 29. If there are no other callers waiting in queue 27, then user telephony subsystem 25 instructs the caller to wait on the line and informs the caller that he/she will be connected to service provider 29 as soon as a service connection is established. If there are other callers already waiting in queue 27, then user interface subsystem 25 requests a set of information from the caller, places the caller in a position in queue 27 that depends on the set of information and the number of callers already waiting in the queue, informs the caller of the location at which he/she is positioned in queue 27, informs the caller of an estimated amount of time before the caller will reach the top of the queue, and manages queue 27 in response to any changes and/or additions the incoming callers make to their respective set of information. The set of information includes information such as the name of the caller, the phone number and/or data network address of the caller, the amount of money the caller is willing to pay, or bid, for a higher spot in queue 27, and the time at which the caller wishes to be removed from the queue. Once the caller provides all the requested information, the caller is informed that he/she will be called-back when a connection to service provider 29 is available, and instructed to hang up. This enables the caller to return to his/her daily activities while waiting for access to the service provider.

When the caller hangs-up, user interface subsystem 25 notifies user agent subsystem 24 that the caller has been included in queue 27. User agent subsystem 24 then keeps track of that caller's location in queue 27. If the caller's position in queue 27 changes drastically (e.g. due to other callers dropping-out of the queue, or due to other callers making bids that higher than the caller's bid), then user agent subsystem 24 initiates a call-back to the caller to inform the caller of the change in priority and to request new information from the caller (e.g. whether the caller wishes to make a new or higher bid), and instructs the caller to hang-up. When the caller reaches a priority position in queue 27 (e.g. a position near the top of queue 27), user agent subsystem 24 again initiates a call-back to the caller. If the caller does not answer the call-back, user agent subsystem 24 then initiates a call-back to a caller having the next-highest priority in queue 27. If the caller answers the call-back, user agent subsystem 24 transfers the call to user interface subsystem 25 which informs the caller that he/she is near the top of queue 27 and asks the caller whether he/she still wishes to gain access to service provider 29. If the caller indicates that he/she does not wish to gain access to service provider 29, user interface subsystem 25 removes the caller from queue 27, terminates the call to the caller, and instructs user agent subsystem 24 to initiate a call-back to a caller having the next-highest priority in the queue. If, however, the caller indicates that he/she does wish to gain access to service provider 29, then user interface subsystem 25 holds the caller on the line until a service connection is made between queuing system 21 and service provider 29.

To establish the service connection, output subsystem 26 places calls to the address (e.g. the phone number or data network address) of service provider 29. When service provider 29 answers the call, the service connection is established. Once the service connection is established, output subsystem 26 connects the caller being held on the line by user interface subsystem 25 to the service connection, thus providing the caller with access to service provider 29. When such access is provided, output subsystem 26 directs billing subsystem 28 to automatically bill the caller for any amounts that he/she bid to move up in queue 27 and/or the amount the caller is being charged for the service provided by queuing system 21, and informs user interface subsystem 25 that access was provided to the caller. User interface subsystem 25 then updates queue 27 so that the caller having the next highest priority is moved up in queue 27. Queuing system 21, therefore, advantageously enables a caller to make a single call to reach service provider 29, and thus eliminates the need for the caller to spend a substantial amount of time waiting on the phone.

It should be noted that the present invention is not limited to providing access to service providers using conventional voice telephony only. A queuing system in accordance with the principles of the present invention can provide access to a service provider in accordance with the principles of the present invention over, for example, a data network via HTTP protocol, or over a TCP/IP virtual circuit. In such embodiments, the calls between the caller, the queuing system and the service provider are data communications that may be in the form of, for example, asynchronous transfer model (ATM) packets. Those skilled in the art are fully aware of hardware and/or software that would be needed to modify queuing system 21, described above, to provide access to service providers using such data communications.

Also, a queuing system in accordance with the principles of the present invention is not limited to the specific subsystems of queuing system 21 described above and shown in FIG. 2. Moreover, the subsystems of queuing system 21 are not limited to any specific hardware and/or combination of hardware and software to provide the functionality described above. That is, user interface subsystem 25 described above and shown in FIG. 2 is not limited to any specific hardware, software or combination thereof Those skilled in the art can use any desired means to achieve the functionality described for user interface subsystem 25. For example, in particular embodiments, user interface subsystem 25 can include software running on a general purpose computer, a data communication mechanism to allow user interface subsystem 25 to interact with a telecommunications system, and the appropriate interfaces for speech signals including a modem, an automatic speech recognition system and a text-to-speech system. To accommodate the terminal equipment used by many different types of callers, user interface subsystem 25, in accordance with the principles of the present invention, may have a variety of user-adjustable parameters that control how talkative user interface subsystem 25 is, and the voice that user interface subsystem 25 will use when informing the caller of, for example, his/her location in the queue.

Similarly, user telephony subsystem 23 described above and shown in FIG. 2 is not limited to any specific hardware, software or combination thereof. Those skilled in the art can use any desired means to achieve the functionality described for user telephony subsystem 23. For example, in particular embodiments, user telephony subsystem 23 can include a server operable to receive requests from the other subsystems 24–26 of queuing system 21, and take the appropriate actions based on those requests. Or, in other particular embodiments, user telephony subsystem 23 can be implemented as a library of functions.

Similarly, user agent subsystem 24 described above and shown in FIG. 2 is not limited to any specific hardware, software or combination thereof. Those skilled in the art can use any desired means to achieve the functionality described for user agent subsystem 24. For example, in particular embodiments, user agent subsystem 24 can be implemented as a computer program running on a general purpose computer operable to perform the above-described functionality. The embodiment of such a computer program is well known by those skilled in the art.

Similarly, output subsystem 26 described above and shown in FIG. 2 is not limited to any specific hardware, software or combination thereof Those skilled in the art can use any desired means to achieve the functionality described for output subsystem 26. For example, in particular embodiments, output subsystem 26 can include a server operable to receive requests from the other subsystems 23–25 of queuing system 21, and take the appropriate actions based on those requests. Or, in other particular embodiments, output subsystem 25 can be implemented as a library of functions.

In addition, the present invention is not limited to any particular embodiment of a billing system for providing, for example, the functionality of billing system 28 described above. Rather, those skilled in the art can employ any means desired to provide the functionality of billing subsystem 28. Such billing systems are well known in the art.

While the invention has been particularly shown and described with reference to the telecommunications system shown in FIG. 1, it will be recognized by those skilled in the art that modifications and changes may be made to the present invention without departing from the spirit and scope thereof For example, in particular embodiments, the invention may be carried-out in a data communications system such as the internet, a TCP/IP system, and/or a teleconferencing system. In such embodiments, the user interface subsystem will, for example, request the data network address of each caller, and the output subsystem will establish a service connection by sending outgoing calls to the data network address of the service provider.

In addition, a queuing system in accordance with the principles of the present invention need not be part of the communications system which it uses to establish a service connection. Instead, for example, the queuing system can be a system that gains access to a communications system by making calls thereto.

Yet further, a queuing system in accordance with the principles of the present invention need not be operable to establish only a direct service connection to the service provider. Instead, for example, the queuing system can be operable to negotiate or bid for access to the service provider through another queuing system or service. Or, the queuing system may be operable to passively accept service connections from the service provider when the service provider has spare capacity.

As a result, the invention in its broader aspects is not limited to specific details shown and described herein. Various modifications may be made without departing from the spirit or scope of the general inventive concept as defined by the appended claims.

We claim:

1. A system for providing a caller with access to a service provider over a communications system, the system comprising:
   a queue;
   means for placing the caller in a given position in said queue such that the caller is able to hang up while being maintained in the queue;
   means making a service connection between the system and the service provider over the communications system; and
   means for connecting the caller to the service provider through said connection made between the system and the service provider when the caller reaches a priority position in said queue.

2. The system of claim 1 further comprising means for obtaining a set of information regarding the caller, said set of information including the caller's identification, the caller's phone number, the caller's data network address, and a bid indicating the amount of money the caller is willing to pay to move to a higher priority location in said queue.

3. The system of claim 2 further comprising means for adjusting the caller's position in said queue based on said set of information.

4. The system of claim 3 further comprising means for calling back the caller when the caller position nears said priority position in said queue.

5. The system of claim 4 wherein said means for making a service connection between the system and the service provider comprises means for generating an outgoing call from the system to the service provider over the communication system.

6. The system of claim 5 wherein the communication system is a telecommunications system.

7. The system of claim 6 wherein said outgoing call is a voice call.

8. The system of claim 6 wherein said outgoing call is a data call.

9. The system of claim 6 wherein said outgoing call is a video conference call.

10. The system of claim 2 further comprising means for enabling a caller to change said bid.

11. The system of claim 10 further comprising means for adjusting the caller's position in said queue based on said change of said bid.

12. The system of claim 11 further comprising means for calling back the caller when the caller position nears said priority position in said queue.

13. The system of claims 1, 9 and 11 wherein said means for placing the caller in a given position in said queue comprises a user telephony subsystem for accepting a call from the caller, and a user interface subsystem for obtaining a set of information of the caller, for placing the caller at a location in the queue that depends said set of information, and for managing the operation of the queue.

14. The system of claim 13 wherein said means for making a connection between the system and the service provider over the communications system comprises an outgoing subsystem operable to generate an outgoing call to the service provider.

15. The system of claim 14 wherein said user telephony subsystem and said output subsystem are co-operable to provide said means for connecting the caller to the service provider through said connection made between the system and the service provider.

16. The system of claim 15 further comprising a billing subsystem for generating a bill to the caller when the caller is connected to the service provider.

17. The system of claim 16 further comprising a user agent subsystem for accepting a bid from the caller, said bid indicating the amount the caller is willing to pay to move to a higher priority position in the queue.

18. The system of claim 17 wherein said bill includes the cost of using the system and the amount bid by the caller to move to a higher priority in the queue.

19. A method for providing a caller with access to a service provider over a communications system, the method comprising the steps of:
   placing the caller in a given position in a queue such that the caller is able to hang up while being maintained in the queue;
   making a connection between the system and the service provider over the communications system; and
   connecting the caller to the service provider through said connection made between the system and the service provider when the caller reaches a priority position in said queue.

20. The method of claim 19 further comprising the step of obtaining a set of information regarding the caller.

21. The method of claim 20 wherein said set of information includes the caller's identification, address, phone number, and data network address.

22. The method of claim 21 wherein said set of information further includes time information regarding the time at which the caller wishes to be removed from the queue, said time information indicating the time at which the caller no longer wishes to gain access to the service provider.

23. The method of claim 22 wherein said set of information further includes bid information, said bid information indicating the amount of money the caller is willing to pay to move to a higher priority location in said queue.

24. The method of claim 23 wherein said given position in which the caller is placed in the queue substantially depends on said bid information.

25. The method of claim 24 further comprising the step of calling-back the caller when the caller reaches a position near said priority position in said queue.

26. The method of claim 25 wherein said step of making a connection between the system and the service provider includes the step of generating an outgoing call from the system to the service provider over the communication system.

27. The method of claim 26 wherein the communication system is a telecommunications system.

28. The method of claim 27 wherein said outgoing call is a voice call.

29. The method of claim 27 wherein said outgoing call is a data call.

30. The method of claim 27 wherein said outgoing call is a video conference call.

31. The method of claim 19 wherein said step of placing the caller in a given position in said queue comprises the steps of accepting a call from the caller, obtaining a set of information of the caller, placing the caller at a location in the queue depending on said set of information, and managing the operation of the queue.

32. The method of claim 31 wherein said step of making a connection between the system and the service provider over the communications system the step of generating an outgoing call to the service provider.

33. The method of claim 32 further comprising the step of the caller when the caller is connected to the service provider.

34. The method of claim 33 further comprising the step of accepting a bid from the caller, said bid indicating the amount the caller is willing to pay to move to a higher priority position in the queue.

35. The method of claim 34 wherein said bill includes the cost of using the system and the amount bid by the caller to move to a higher priority in the queue.

\* \* \* \* \*